United States Patent
Bian et al.

(10) Patent No.: US 9,467,499 B2
(45) Date of Patent: Oct. 11, 2016

(54) METHOD AND MANAGEMENT APPARATUS FOR PERFORMING OPERATION ON DEVICE RESOURCE

(71) Applicant: Huawei Technologies Co., Ltd., Shenzhen, Guangdong (CN)

(72) Inventors: Yonggang Bian, Nanjing (CN); Yongjing Zhang, Nanjing (CN); Lunjian Mu, Shenzhen (CN); Jue Wang, Nanjing (CN); Lei Jin, Nanjing (CN); Ke Xu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 13/784,328

(22) Filed: Mar. 4, 2013

(65) Prior Publication Data

US 2013/0179557 A1 Jul. 11, 2013

Related U.S. Application Data

(63) Continuation of application No. PCT/CN2011/078898, filed on Aug. 25, 2011.

(30) Foreign Application Priority Data

Feb. 18, 2011 (CN) .......................... 2011 1 0040791

(51) Int. Cl.
*G06F 15/173* (2006.01)
*H04L 29/08* (2006.01)
(Continued)

(52) U.S. Cl.
CPC ............... *H04L 67/10* (2013.01); *H04L 41/00* (2013.01); *H04L 41/0293* (2013.01); *H04W 4/005* (2013.01); *H04L 47/70* (2013.01); *H04L 47/78* (2013.01)

(58) Field of Classification Search
CPC ..... H04L 129/08; H04L 67/10; H04L 41/00; H04L 41/0293; H04L 67/14; H04L 47/70; H04L 47/78; H04W 48/16; H04W 4/005; G06F 17/30982

USPC ............... 709/233, 238, 227, 224, 223, 226; 370/329; 726/17; 455/425
See application file for complete search history.

(56) References Cited

U.S. PATENT DOCUMENTS

| | | | |
|---|---|---|---|
| 2003/0005121 A1* | 1/2003 | Washio et al. | ................ 709/225 |
| 2003/0014528 A1 | 1/2003 | Crutcher et al. | |

(Continued)

FOREIGN PATENT DOCUMENTS

| | | |
|---|---|---|
| CN | 1956380 A | 5/2005 |
| CN | 101420337 A | 4/2009 |
| CN | 101741731 A | 6/2010 |

OTHER PUBLICATIONS

1st Office Action in corresponding Chinese Patent Application No. 201110040791.7 (Mar. 5, 2013).

(Continued)

*Primary Examiner* — Jungwon Chang
(74) *Attorney, Agent, or Firm* — Leydig, Voit & Mayer, Ltd.

(57) ABSTRACT

A method for performing an operation on a device resource includes: receiving a first request, which is requests an operation on a device resource, where a destination address of the first request is a mapped address of the device resource on a management apparatus; determining, that the device resource is created on a device corresponding to the device resource; generating a second request for performing an operation on the device resource on the device; and transmitting the second request to the device. A management apparatus for performing an operation on a device resource is also provided. By using the present invention, the complexity for the network application to perform an operation on the device resource can be reduced, and the convenience for the network application to perform an operation on the device resource can be improved. Therefore, extensive application of M2M can further be promoted.

18 Claims, 8 Drawing Sheets

(51) Int. Cl.
  *H04L 12/24* (2006.01)
  *H04W 4/00* (2009.01)
  *H04L 12/911* (2013.01)

(56) References Cited

U.S. PATENT DOCUMENTS

| | | | |
|---|---|---|---|
| 2006/0019652 A1* | 1/2006 | Itabashi | H04W 48/16 455/425 |
| 2006/0101196 A1* | 5/2006 | Urmston | G06F 17/30982 711/108 |
| 2009/0109949 A1* | 4/2009 | Wu et al. | 370/345 |
| 2009/0187573 A1 | 7/2009 | Johnston et al. | |
| 2010/0067378 A1* | 3/2010 | Cohen et al. | 370/231 |
| 2010/0138544 A1* | 6/2010 | Guo | H04L 67/14 709/227 |

OTHER PUBLICATIONS

"802.15.4—IEEE Standard for Information Technology—Telecommunications and Information Exchange between Systems—Local and Metropolitan Area Networks—Specific Requirements; Part 15.3: Wireless Medium Access Control (MAC) and Physical Layer (PHY) Specifications for Low-Rate Wireless Personal Area Networks (LR-WPANs)," Oct. 1, 2003, IEEE, New York, New York.

"Machine-to-Machine Communications (M2M); Functional Architecture," Draft ETSI TS 102 690 V 0.10.1, 2011, European Telecommunications Standards Institute, France.

International Search Report in corresponding PCT Patent Application No. PCT/CN2011/078898 (Dec. 1, 2011).

* cited by examiner

METHOD AND MANAGEMENT APPARATUS FOR PERFORMING OPERATION ON DEVICE RESOURCE

CROSS-REFERENCE TO RELATED APPLICATIONS

This application is a continuation of International Patent Application No. PCT/CN2011/078898, filed on Aug. 25, 2011, which claims priority to Chinese Patent Application No. 201110040791.7, filed on Feb. 18, 2011, both of which are hereby incorporated by reference in their entireties.

FIELD OF THE INVENTION

The present invention relates to the field of communications, and in particular, to a method and a management apparatus for performing an operation on a device resource in the field of communications.

BACKGROUND OF THE INVENTION

M2M (machine to machine) is an abbreviation for machine to machine communication, and is, in a narrow sense, implementation of data exchange between machines through short distance communication technologies, such as Zigbee (that is, IEEE 802.15.4 protocol) and WLAN (Wireless Local Area Networks), and long distance wireless communication technologies, such as GSM (Global System for Mobile Communications)/GPRS (General Packet Radio Service), UMTS (Universal Mobile Telecommunications System)/HSDPA (High Speed Downlink Packet Access), CDMA (Code Division Multiple Access)/EVDO (Evolution-Data Only). In brief, all machines in the world could be incorporated into one communication network, so that all the machines are intellectualized. In a broad sense, the M2M also includes human to machine communication and machine to human communication.

Application of the M2M grows very rapidly in the market of vertical industries. These vertical industries include smart home, security monitoring, electronic healthcare, retailing, and logistics monitoring. Because of the lack of a uniform M2M standard, application of the M2M to the vertical industries is generally that a vendor provides an end-to-end solution, so that a device and an application are strongly coupled, which results in a high deployment cost. Besides, massively deployed vertical applications of the M2M form isolated information islands independent of one another, which makes it difficult to share information, thereby easily causing redundant construction. All of these unfavorable factors considerably hinder further development of the vertical applications of the M2M. Therefore, it is necessary to construct a horizontal platform of the M2M, so as to achieve information sharing and reduce the deployment cost of the M2M, thereby further promoting extensive application of the M2M.

A REST (Representational State Transfer) style is a design and development mode for a network application, and is extensively applied to the current Internet. What needs to be done by the M2M is to connect an object to the Internet to form an Internet of things. Therefore, it is a natural choice to use a REST style interface in the M2M. A foundation of the REST style is representation of a resource. Resources in the M2M may be statically stored data, for example, historical measurement data, and may also be dynamic processing programs, for example, instant measurement data. Some of these resources may be rapidly accessed on the M2M platform by the network application, for example, the historical measurement data. Some of these resources must be stored on a device, for example, a resource for controlling the device. For some resources, it needs to be determined, according to a situation of the device, whether the resources are to be stored on the M2M platform or on the device. For example, for latest measurement data of the device, if the device reports the latest measurement data to the platform based on a change of the measurement data, the latest measurement data may be stored on the M2M platform. If the device receives an instant measurement data command and reports the latest measurement data, the latest measurement data resource must be stored on the device.

Currently, a possible method for the network application to perform an operation on a resource through the M2M platform is: A client end requests the resource from a front end management server. The front end management server performs an authorization check through an authorization management server. After the request passes the authorization check, if the front end management server determines that it is indicated in a requested URI (Uniform Resource Identifier) that the resource identifier is an indirect access resource identifier, it needs to find where the resource really is, and accordingly transmit the indirect access resource identifier to a location management server to request acquiring a real resource identifier. The URI containing an indirect access resource identifier is, for example, HTTP://Front_End_MGR/Flag/Obscured_Resource_MGR_ID/Resource_On_MGR, where "Flag/" indicates that the indirect access resource identifier is "Obscured_Resource_MGR_ID". Subsequently, the location management server finds the corresponding real resource identifier according to the indirect access resource identifier, and returns the corresponding real resource identifier to the front end management server. The front end management server requests acquiring the resource from a back end management server, where the request contains the real resource identifier. The back end management server constructs a request according to the real resource identifier, and requests acquiring the corresponding resource from a resource management server. The resource management server returns the resource, which is requested by the back end management server and is corresponding to the URI. The back end management server returns, to the front end management server, the resource acquired from the resource management server. Finally, the front end management server returns, to the client end, the resource returned by the back end management server.

In the above method, the organizational structure of the URI for directly acquiring the resource is different from that of the URI for indirectly acquiring the resource, where the URI for indirectly acquiring the resource needs to have indicators, such as "Flag/", so as to indicate that the URI is a URI for indirectly acquiring a resource. In the M2M, data of the same type may be stored on the platform, and may also be stored on the device. If the above method is applied to the M2M, when network applications request a resource from the M2M platform together, the network applications need to face different URI organizational structures. For example, for the same resources that are the latest measurement data, it is possible that a certain device reports the resource to the M2M platform when the data is changed, and then the corresponding resource is on the platform; while another device may receive an instant measurement command and return a measurement value, and then the corresponding resource is on the device. Therefore, for resources of the same type on different devices, the organizational structures of the URIs for acquiring the resources are different. In this case, the network application needs to first acquire beforehand the URI of the resource through searching, and then the network application can request the M2M platform for performing an operation on a certain resource, which increases processing complexity of the network application and is unfavorable for promoting extensive application of the M2M.

SUMMARY OF THE INVENTION

Embodiments of the present invention provide a method and a management apparatus for performing an operation on a device resource, which can reduce the complexity for a network application to perform an operation on a device resource, and improve the convenience for the network application to perform an operation on the device resource, thereby further promoting extensive application of M2M.

In one aspect, an embodiment of the present invention provides a method for performing an operation on a device resource. The method includes: receiving a first request, which is from a network application and requests an operation on a device resource, where a destination address of the first request is a mapped address of the device resource on a management apparatus; determining, according to the mapped address, that the device resource is created on a device corresponding to the device resource; based on a description resource of the device resource, generating a second request for performing an operation on the device resource on the device, where a destination address of the second request is an address of the device resource on the device; and transmitting the second request to the device.

In another aspect, an embodiment of the present invention provides a management apparatus for performing an operation on a device resource. The management apparatus includes a first receiving module, a first determining module, a generating module, and a first transmitting module. The first receiving module is configured to receive a first request, which is from a network application and requests an operation on a device resource, where a destination address of the first request is a mapped address of the device resource on the management apparatus. The first determining module is configured to determine, according to the mapped address, that the device resource is created on a device corresponding to the device resource. The generating module is configured to generate, based on a description resource of the device resource, a second request for performing an operation on the device resource on the device, where a destination address of the second request is an address of the device resource on the device. The first transmitting module is configured to transmit the second request to the device.

Based on the above technical solutions, in the method and the management apparatus for performing an operation on a device resource in the embodiments of the present invention, based on the mapped address of the device resource on the management apparatus, the network application may perform an operation on the device resource, so that the management apparatus can provide a uniform device resource access interface to the network application, thereby reducing the complexity for the network application to perform an operation on the device resource and improving the convenience for the network application to perform an operation on the device resource. Therefore, the extensive application of the M2M can further be promoted.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments in the present invention without creative efforts shall fall within the protection scope of the present invention.

Figure 1:
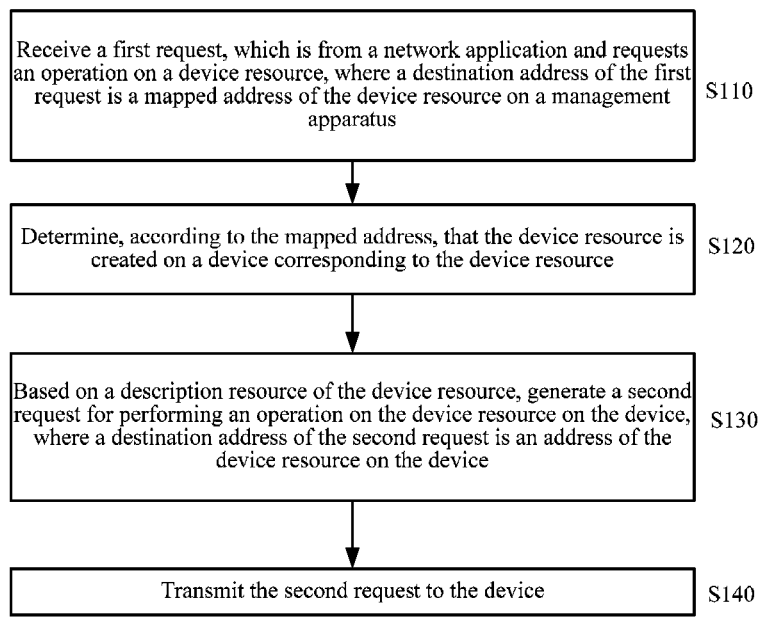
FIG. 1 is a schematic diagram of a method for performing an operation on a device resource according to an embodiment of the present invention.

FIG. 1 is a schematic diagram of a method 100 for performing an operation on a device resource according to an embodiment of the present invention. As shown in FIG. 1, the method 100 includes:

S110: Receive a first request, which is from a network application and requests an operation on a device resource, where a destination address of the first request is a mapped address of the device resource on a management apparatus; and the mapped address includes an address of the management apparatus and an identifier of the device resource.

S120: Determine, according to the mapped address, that the device resource is created on a device corresponding to the device resource.

S130: Based on a description resource of the device resource, generate a second request for performing an operation on the device resource on the device, where a destination address of the second request is an address of the device resource on the device.

S140: Transmit the second request to the device.

It should be understood that, in the embodiment of the present invention, the network application includes various application entities using a network, for example, a device entity, a device application entity, a gateway entity, a gateway application entity, and a service capability entity, and the management apparatus includes an apparatus for performing an operation on a device resource and maintaining the device resource, for example, a system platform. Persons skilled in the art may understand that, in M2M, the network application includes an M2M entity, the M2M entity may include an M2M device, or an M2M application, or M2M data, and the management apparatus may include an M2M platform.

It should also be understood that, in the embodiment of the present invention, the device resource may be a statically stored data resource, and may also be a dynamic resource of application. Some device resources may be stored on the management apparatus for quick access of the network application. Some device resources must be stored on a corresponding device. For some device resources, it needs to be determined, according to a situation of the device, whether the resources are to be stored on the management apparatus or on the device.

When the network application needs to perform an operation on a device resource, for example, needs to acquire a device resource, the network application may transmit a first request to the management apparatus, where a destination address of the first request is a mapped address of the device resource on the management apparatus. The mapped address includes an address of the management apparatus and an identifier of the device resource, and the identifier of the device resource may include a device identifier of the device corresponding to the device resource. Therefore, no matter whether the device resource is stored on the management apparatus or is stored on the corresponding device, the management apparatus may provide a uniform URI access interface to the network application for performing an operation on the device resource, and does not need a tag, such as "Flag", to distinguish a directly accessed device resource from an indirectly accessed device resource, so that the network application does not need to acquire beforehand a URI of the device resource through searching.

The management apparatus may determine, according to the mapped address, that the device resource is created on the corresponding device, for example, according to the identifier of the device resource and the device identifier in the mapped address, the management apparatus may perform querying in a device resource management table saved in the management apparatus, so as to determine that the device resource is created on the corresponding device. The device resource management table may be maintained according to registration of devices and/or device applications on the management apparatus or according to creation of description resources on the management apparatus.

In the embodiment of the present invention, for the device resource created on the device, the management apparatus includes a description resource for describing the device resource. The description resource may be created according to a description resource creating request transmitted by the device. The description resource includes an address of the device resource on the corresponding device and the identifier of the device resource. Therefore, the management apparatus may transmit, according to the address of the device resource on the corresponding device, a second request for performing an operation on the device resource on the device to the device.

When the management apparatus determines that the device resource is created on the corresponding device, the management apparatus may generate, based on the description resource of the device resource, a second request, and transmit the second request to the device, where a destination address of the second request is an address of the device resource on the device, so that the network application can perform an operation on the device resource on the device through the management apparatus.

In the method for performing an operation on a device resource in the embodiment of the present invention, based on the mapped address of the device resource on the management apparatus, the network application may perform an operation on the device resource, so that the management apparatus can provide a uniform device resource access interface to the network application, thereby reducing the complexity for the network application to perform an operation on the device resource and improving the convenience for the network application to perform an operation on the device resource. Therefore, extensive application of M2M can further be promoted.

Figure 2:
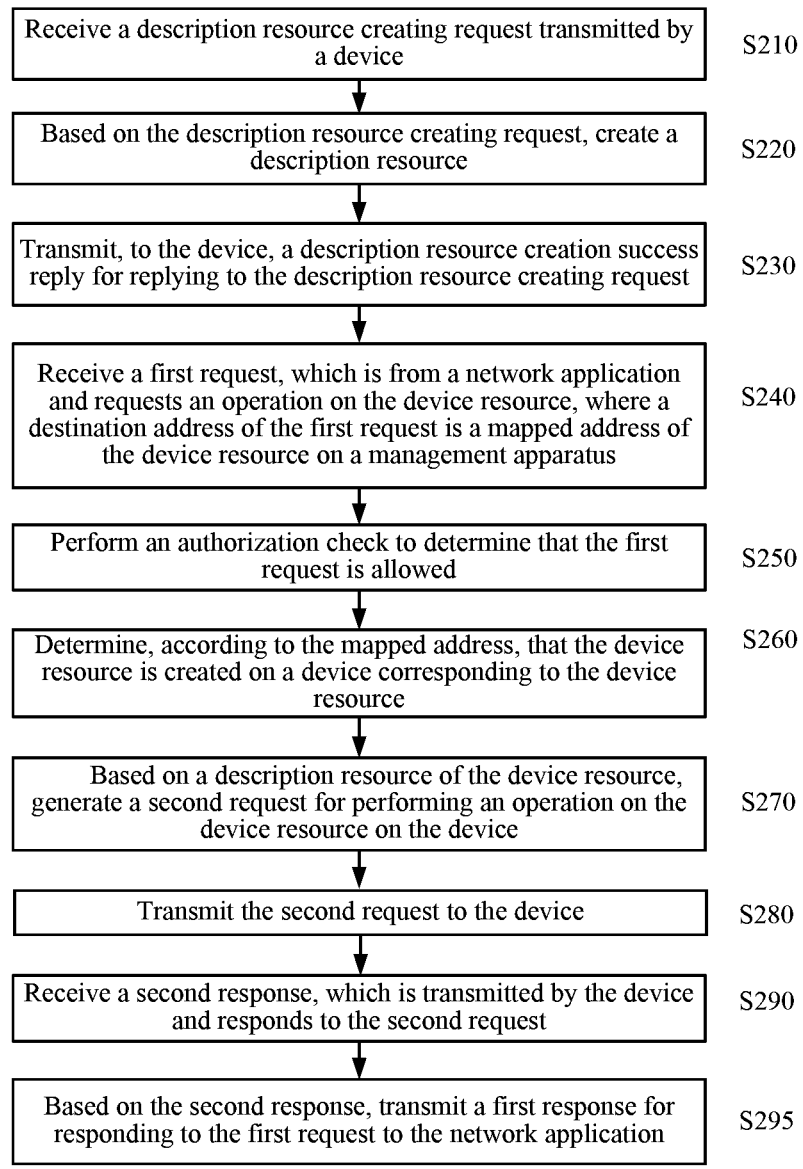
FIG. 2 is a schematic diagram of a method for performing an operation on a device resource according to another embodiment of the present invention.

In another embodiment of the present invention, a method according to the embodiment of the present invention further includes: creating, on a management apparatus, a description resource for a device resource, where the device resource is created on a device corresponding to the device resource, and the description resource is used for describing the device resource, as shown in S210 and S220 in a method 200 in FIG. 2.

S210, a management apparatus receives a description resource creating request transmitted by the device. The description resource creating request is used for requesting creating the description resource for describing the device resource, where the device resource is created on the device, and the device resource may include the device and/or a device application of the device. The description resource creating request may include an identifier and relevant description of the device and/or the device application, for example, an address, a type, and a corresponding interface logic model of the device resource, and other parameters that need to be provided by the device and/or the device application, for example, some parameters related to security.

In S220, the management apparatus creates, based on the description resource creating request, a description resource for describing the device resource, where the description resource includes an address of the device resource on the device and an identifier of the device resource.

It should be understood that the process of creating the description resource may also include an authentication process, for example, the authorization may be implemented based on technologies, such as a digital certificate or a pre-shared key. Because the description resource for describing the device resource is created on the management apparatus for the device resource, the management apparatus may convert, according to the description resource of the device resource, the first request into a second request that is for performing an operation on the device resource on the device. Of course, the conversion may also be implemented in other manners.

After the corresponding description resource is created on the management apparatus, the management apparatus may transmit, to the device, a description resource creation success reply for replying to the description resource creating request, where the description resource creation success reply includes an address of the description resource, as shown in S230 in FIG. 2. In this way, after the description resource is created, if an attribute of the device resource of the device is changed, the device may perform an operation, such as update or deletion, on the description resource according to the address, so as to maintain the description resource of the device resource.

In the embodiment of the present invention, the device resource may be indirectly created on the device, and may also be directly created on the management apparatus. When a device resource needs to be directly created on the management apparatus, the management apparatus may directly create the device resource according to a REST access method. For example, the device resource may be created on the management apparatus through HTTP (HyperText Transfer Protocol, that is, hypertext transfer protocol) POST (creation) or COAP (Constrained Application Protocol, that is, constrained application protocol) POST.

In the embodiment of the present invention, the method for performing an operation on a device resource according to the embodiment of the present invention may also include registration of the device and/or the device application on the management apparatus, to notify the identifier of the relevant device and/or device application to the management apparatus. It should be understood that the process of directly creating the device resource on the management apparatus and the process of creating the description resource of the device resource on the management apparatus may be performed together with the registration process, and may also be separately performed. For example, the registration of the device and/or the device application may be first performed, and then the device resource or the description resource may be created. These equivalent modifications or replacements shall all fall within the scope of the embodiments of the present invention.

In the embodiment of the present invention, after the device or a certain function of the device directly creates the device resource on the management apparatus, and/or after the device or a certain function of the device first creates the device resource on the device and then creates the corresponding description resource on the management apparatus, if the network application requests performing an operation on the device resource, the management apparatus may perform an authorization check after receiving a first request that the network application requests performing an operation on the device resource (as shown in S240 in FIG. 2), so as to determine that the first request is allowed (as shown in S250 in FIG. 2). Then, according to a mapped address of the device resource on the management apparatus in the first request, the management apparatus determines whether the device resource is created on the management apparatus or is created on the device corresponding to the device resource. If the management apparatus determines that the device resource is directly created on the management apparatus, the management apparatus performs a corresponding operation on the device resource according to the first request, and transmits, to the network application, a third response for responding to the first request, where the third response is used for indicating a situation in which the management apparatus performs an operation on the device resource created on the management apparatus, and the third response is generated based on a communication protocol opened by the management apparatus to the network application.

If the management apparatus determines that the device resource is created on the corresponding device (as shown in S260 in FIG. 2), the management apparatus generates a second request for performing an operation on the device resource on the device (as shown in S270 in FIG. 2), and transmits the second request to the device (as shown in S280 in FIG. 2). In S270, if a protocol for communication between the network application and the management apparatus is different from a protocol for communication between the management apparatus and the device, when generating the second request, the management apparatus also needs to perform protocol conversion. That is, the second request is generated based on the protocol for communication between the management apparatus and the device.

In the above embodiment of the present invention, the method according to the embodiment of the present invention may also include:

S290: The management apparatus receives a second response which is transmitted by the device and responds to the second request, where the second response is used for indicating a situation in which the device performs an operation on the device resource created on the device, and the second response is generated based on the protocol for communication between the device and the management apparatus.

S295: The management apparatus transmits, based on the second response, a first response for responding to the first request to the network application, where the first response is used for indicating a situation in which the management apparatus performs an operation on the device resource, and the first response is generated based on the communication protocol opened by the management apparatus to the network application.

In the method for performing an operation on a device resource in the embodiment of the present invention, based on the mapped address of the device resource on the management apparatus, the network application may perform an operation on the device resource, so that the management apparatus can provide a uniform device resource access interface to the network application, thereby reducing the complexity for the network application to perform an operation on the device resource and improving the convenience for the network application to perform an operation on the device resource. Therefore, extensive application of M2M can further be promoted.

Use of the method according to the embodiment of the present invention to the M2M is taken as an example in the following for illustrating in detail the method for performing an operation on a device resource according to the embodiment of the present invention.

Figure 3:
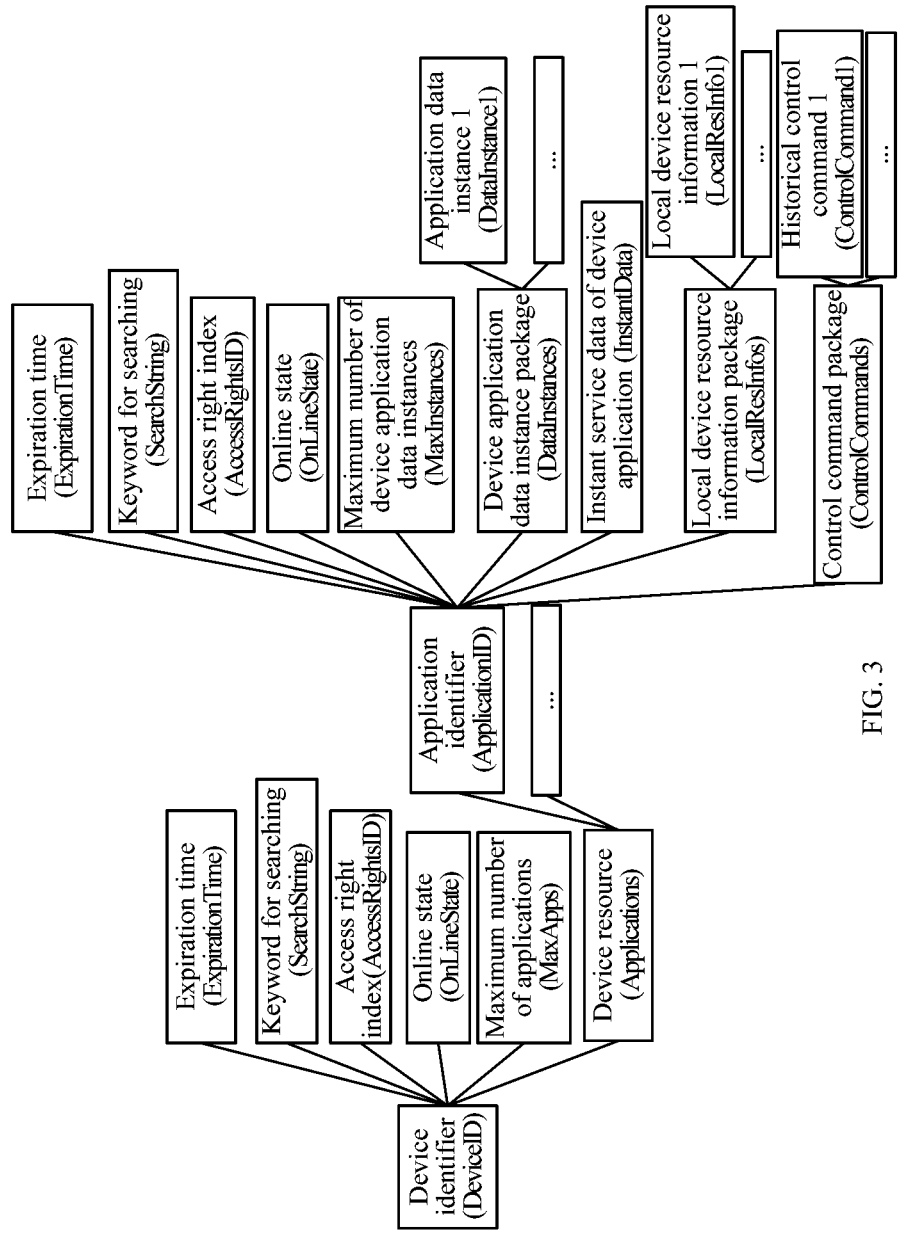
FIG. 3 is a schematic diagram of a logic model of a device resource interface according to an embodiment of the present invention.

FIG. 3 shows a logic model of a device resource interface on a management apparatus (that is, an M2M platform) for a device. As shown in FIG. 3, in this logic model, DeviceID denotes a device identifier, used for representing a device, and DeviceID includes several attributes and applications on the device. ExpirationTime denotes an expiration time, used for illustrating a period of validity of a device resource on a parent node. SearchString denotes a keyword for searching, and is keyword description of the parent node. AccessRightsID denotes an access right index, used for pointing to a specific access right and controlling access to the parent node. OnlineState denotes an online state, used for describing an online situation of the device or the application on the device. MaxApps denotes the maximum number of applications on the device. Applications denote a device resource including 0 to a plurality of applications. ApplicationID denotes an identifier of an application on the device, used for representing the application on the device and ApplicationID includes several attributes. MaxInstances denotes the maximum number of device application data instances, used for indicating the maximum number of DataInstance allowed. DataInstances denotes a device application data instance package, which includes several device application data instances. DataInstance denotes an application data instance, and is used for storing a single batch of application data of the device, and when a new application data instance is created, if the number of application data instances exceeds the number specified by the MaxInstances, an oldest application data instance is deleted. LocalResInfos denotes a local device resource information package, which includes several pieces of local device resource information, where a local device resource refers to a device resource created on the device. LocalResInfos denotes local device resource information, and is used for describing device resource information, which exists locally on the device and is related to the device or the application on the device, and LocalResInfos includes the following attributes.

(a): Address, which denotes a URI address corresponding to the device resource.

(b): FunctionType, which denotes a function type and is used for illustrating a function type corresponding to the device resource. The FunctionTypes of a plurality of LocalResInfos under one LocalResInfos node cannot be repeated. Two function types are shown in the embodiment of the present invention. It should be understood that the function type may also be extended according to a requirement. The two function types are as follows:

(1): RetrieveData, which denotes acquiring instant service data, where a local device resource related to an M2M application may be corresponding to this function type.

(2): PushCommand, which denotes delivering a control command, where the local device resource related to the M2M application may also be corresponding to this function type.

(c): PlatformRefAddr, which denotes a reference address accessed by the device resource through the M2M platform. The network application accesses the device resource through this address. Only one of this attribute and the FunctionType attribute can be selected. If this attribute is set, the M2M platform sets the device resource corresponding to this address in such a way that the M2M platform converts the request of the network application, requests the device resource from an actual device resource URI address, and returns the device resource to the network application through a reply.

(d): DataModleConstrain, which denotes that when the function type is PushCommand, a data model of the control command is constrained, to be represented in the form of an XML Schema.

InstantData denotes the instant service data of the device application, and is used for acquiring the instant service data of the device application. On an M2M platform, a static data device resource may be used to denote the instant service data of the device application, and the instant service data may also be acquired from the device application according to a description resource. The M2M platform may automatically create, update and delete the description resource of the device resource according to the creation, update and deletion of a LocalResInfos whose FunctionType attribute is RetrieveData.

ControlCommands denotes a control command package, and is used for creating a child resource for transmitting a control command. The child resource is created on the M2M platform, so that the M2M platform transmits the control command to the device, acquires the reply of the device and returns the reply of the device to a creating party, and meanwhile, returns an address of the child resource created on the platform. The M2M platform may automatically create, update and delete the description resource of the device resource according to the creation, update and deletion of a LocalResInfos whose FunctionType attribute is PushCommand.

ControlCommand denotes a historical control command, the maximum number of the commands is determined by the M2M platform, or is limited by an attribute newly added by the application.

The two function types corresponding to the device resource, that is, acquiring the instant service data and delivering the control command, are taken as an example in the following for specifically illustrating the method for performing an operation on a device resource created on a device according to the embodiment of the present invention.

Figure 4:
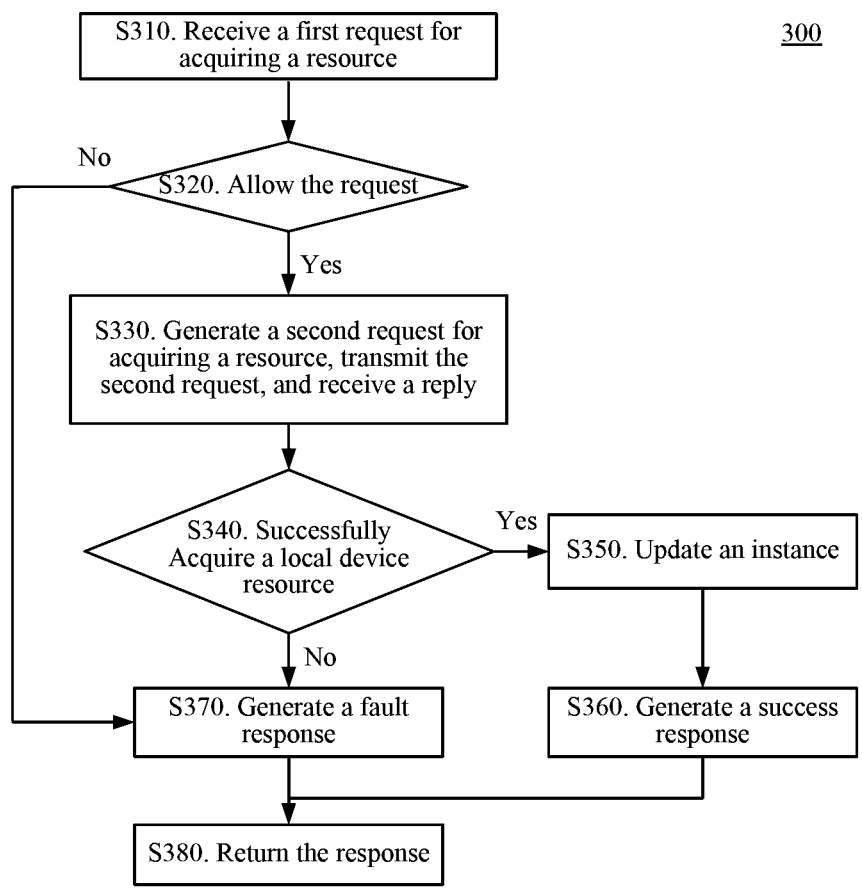
FIG. 4 is a schematic diagram of a method for acquiring a device resource according to an embodiment of the present invention.

FIG. 4 is a schematic diagram of a method 300 for acquiring a device resource according to an embodiment of the present invention. As shown in FIG. 4, an M2M platform receives a first request, which is transmitted by the network application and requests acquiring a device resource, where a destination address of the first request is a mapped address of the device resource on the M2M platform (as shown in S310). The M2M platform performs an authorization check on the first request to determine whether to allow the first request (as shown in S320). If the first request does not pass the authorization check, the process proceeds to S370; otherwise, the M2M platform generates a second request for requesting acquiring the device resource, transmits the second request to a device corresponding to the device resource, and receives a second response which is transmitted by the device and responds to the second request, where a destination address of the second request is an address of the device resource on the corresponding device (as shown in S330). In S330, if a protocol supported by the device corresponding to the device resource for communication with the M2M platform is different from a protocol opened by the M2M platform to the network application, the M2M platform also needs to perform protocol conversion in the process of generating the second request.

In S340, the M2M platform determines whether the device resource is successfully acquired. If the M2M platform successfully acquires the device resource, the process proceeds to S350; otherwise, the process proceeds to S370. In S350, the M2M platform uses latest location information or service data carried in the received second response to update an application data instance (DataInstance), which is corresponding to the device, in a logic model of a device resource interface of the M2M platform. In S360, the M2M platform generates a first response indicating a successful operation performed on the device resource, the process proceeds to S380. In S370, the M2M platform generates a first response indicating a faulty operation performed on the device resource. In S380, the M2M platform transmits, to the network application, the first response generated in S360 or S370.

Figure 5:
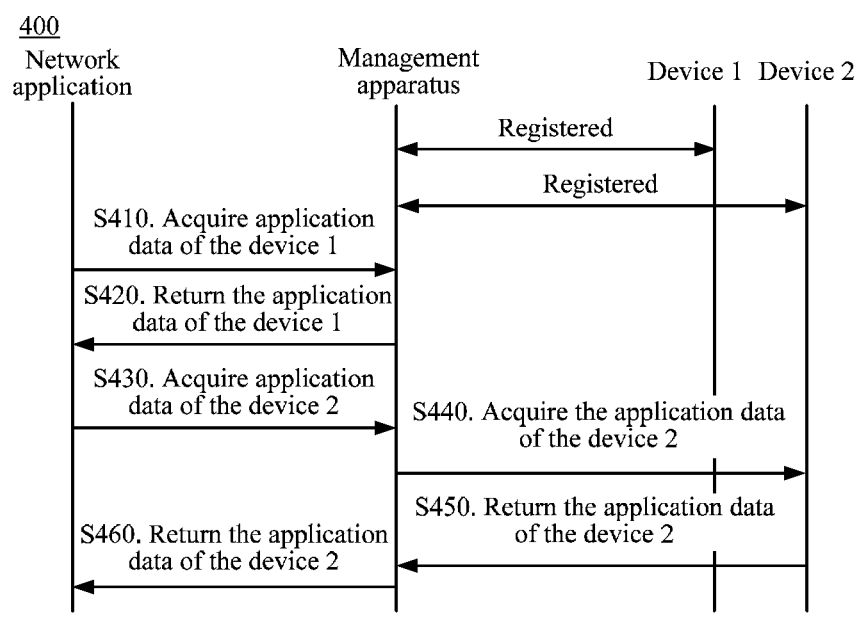
FIG. 5 is a schematic diagram of a method for acquiring a device resource according to another embodiment of the present invention.

FIG. 5 is a schematic diagram of a method 400 for acquiring a device resource according to another embodiment of the present invention. In this embodiment, an example that the network application acquires the same application data of different devices is shown.

As shown in FIG. 5, a device 1 and a device 2 both include an application for reporting temperature data, and a difference lies in that the temperature reporting application 1 on the device 1 is used for reporting temperature according to the change of the temperature, so as to be used for controlling an air conditioner, and therefore, the device 1 directly creates, on an M2M platform, a static device resource used for reporting the temperature data; while the temperature reporting application 1 of the same application type (or function) on the device 2 is only used for querying the temperature, and therefore, a device resource used as the temperature data is created on the device 2, and the device 2 creates, on the M2M platform, a description resource for describing the device resource. The description resource includes an address of the device resource on the device, an identifier and a function type of the device resource. A specific example of the description resource is shown in the following:

```
<LocalResInfo >
    <Address>coap://deviceID2.sense.m2m.com/Applications/
Application1/InstantData</Address>
    <FunctionType> RetrieveData </FunctionType>
</LocalResInfo>.
```

When the network application queries the temperature data of the temperature reporting applications of all devices, the specific process is as follows:

In S410, the network application transmits, to the M2M platform, a request 1 for performing an operation on the device resource of the device 1, where the request 1 is used for requesting acquiring instant data of the temperature reporting application 1 on the device 1. The request 1 is as follows:

```
GET .../DeviceID1/Applications/Application1/InstantData/
    Host: example.com:80.
```

In S420, the M2M platform directly acquires static temperature data corresponding to the request 1, and returns a response to the network application, where the response includes the temperature data of the temperature reporting application 1 on the device 1. The response is as follows:

```
HTTP/1.1 200 OK
    Content-Type: application/xml; charset=UTF-8
    <InstantData>...</InstantData>.
```

In S430, the network application transmits, to the M2M platform, a request 2 for performing an operation on the device resource of the device 2, where the request 2 is used for requesting acquiring instant data of the temperature reporting application 1 on the device 2. The request 2 is as follows:

```
GET .../DeviceID2/Applications/Application1/InstantData/
    Host: example.com:80.
```

In S440, the M2M platform generates, according to the description resource of the device resource, a request 3 for acquiring the device resource on the device 2, where a destination address of the request 3 is an address of the device resource on the device. The request 3 is as follows:

```
CON tid=01
    GET .../Applications/Application1/InstantData/
        Host: deviceID2.sense.m2m.com:80.
```

It should be understood that a text format is directly used for ease of description, and an actual COAP protocol is of a binary encapsulation form, where a command and a header field both have specific binary coding.

In S450, the device 2 receives the request 3 from the M2M platform, acquires the temperature data after positioning processing, and returns the temperature data to the M2M platform. A returned response is as follows:

```
ACK tid=01
200 OK
    Content-Type: application/xml; charset=UTF-8
        <InstantData>...</InstantData>.
```

Likewise, it should be understood that the description herein also directly adopts the text format, and has a difference from an actual COAP packet, and the description of the packet is only exemplary, and does not construct any limit to the embodiment of the present invention.

In S460, after receiving the temperature data returned by the device 2, the M2M platform returns the temperature data to the network application. A returned response is as follows:

```
HTTP/1.1 200 OK
    Content-Type: application/xml; charset=UTF-8
        <InstantData>...</InstantData>.
```

It can further be learned from the above specific embodiment that, in the method for performing an operation on a device resource in the embodiment of the present invention, based on the mapped address of the device resource on the management apparatus, the network application may perform an operation on the device resource, so that the management apparatus can provide a uniform device resource access interface to the network application, thereby reducing the complexity for the network application to perform an operation on the device resource and improving the convenience for the network application to perform an operation on the device resource. Therefore, extensive application of M2M can further be promoted.

Figure 6:
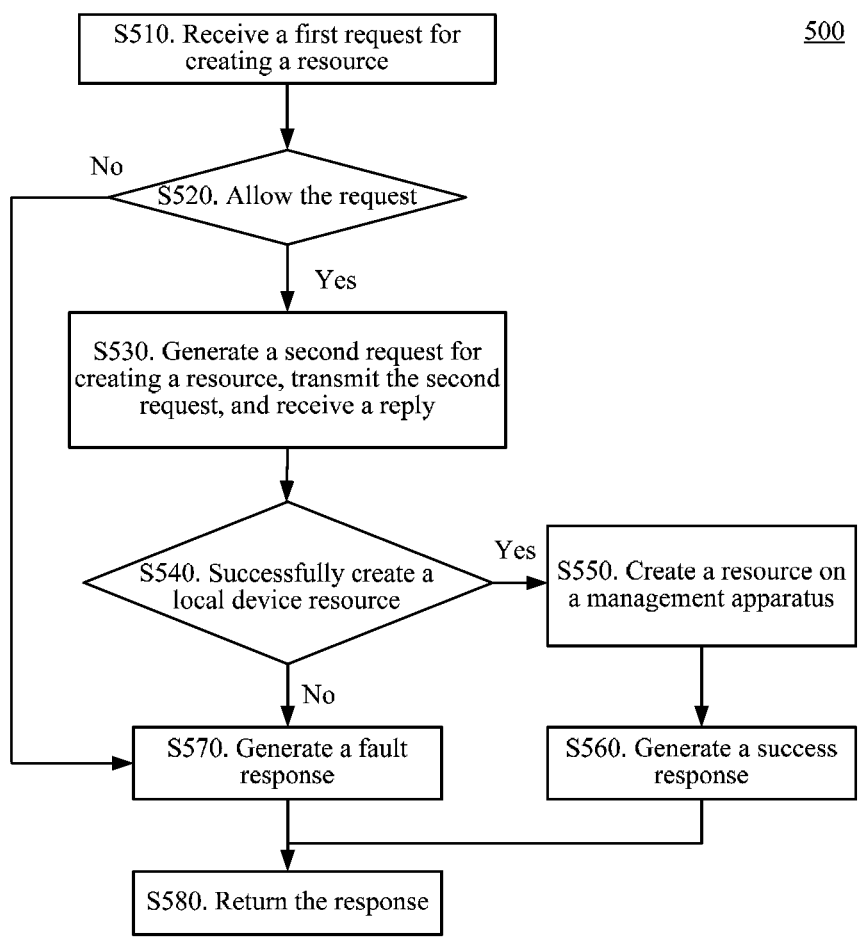
FIG. 6 is a schematic diagram of a method for transmitting a control command to a device resource according to an embodiment of the present invention.

FIG. 6 is a schematic diagram of a method 500 for transmitting a control command to a device resource according to an embodiment of the present invention. As shown in FIG. 6, in S510, an M2M platform receives a first request, which is transmitted by a network application and requests transmitting a control command to a device resource. The control command is, for example, to create a ControlCommand resource, and a destination address of the first request is a mapped address of the device resource on the M2M platform.

In S520, the M2M platform performs an authorization check and a request data validity check on the first request to determine whether to allow the first request, where the validity check on control command data is performed according to an interface data model in a description resource. If the first request is allowed, the process proceeds to S530; otherwise, the process proceeds to S570.

In S530, the M2M platform generates a second request for requesting transmitting the control command, transmits the second request to a device corresponding to the device resource, and receives a second response, which is transmitted by the device and responds to the second request, where a destination address of the second request is an address of the device resource on the corresponding device. Similarly, if a protocol for communication between the device and the M2M platform is different from a protocol opened by the M2M platform to the network application, the M2M platform also needs to perform protocol conversion in the process of generating the second request.

In S540, the M2M platform determines whether the ControlCommand resource is successfully created on the device. If the M2M platform successfully creates the resource, the process proceeds to S550; otherwise, the process proceeds to S570.

In S550, the M2M platform creates or records, on itself, a ControlCommand resource in a logic model of a device resource interface.

In S560, the M2M platform generates a first response indicating a successful operation performed on the device resource, the process proceeds to S580.

In S570, the M2M platform generates a first response indicating a faulty operation performed on the device resource.

In S580, the M2M platform transmits, to the network application, the first response generated in S560 or S570.

Figure 7:
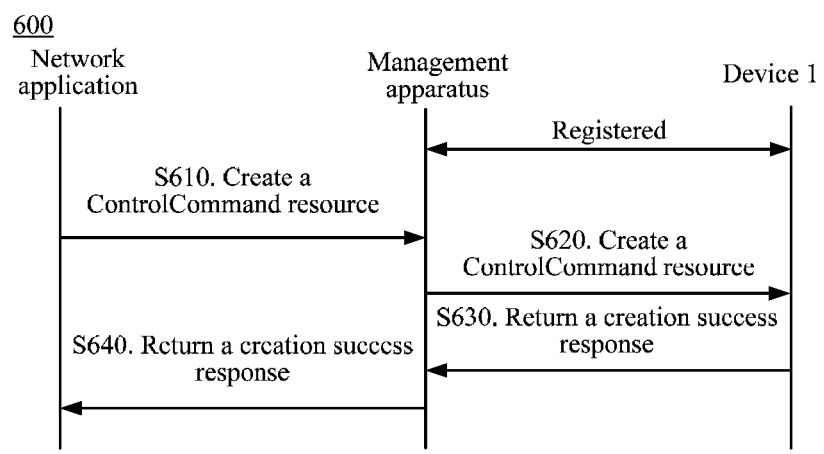
FIG. 7 is a schematic diagram of a method for transmitting a control command to a device resource according to another embodiment of the present invention.

FIG. 7 is a schematic diagram of a method 600 for transmitting a control command to a device resource according to another embodiment of the present invention.

As shown in FIG. 7, before the network application transmits a control command to an application 1 on a device 1, the device 1 and the application 1 on the device 1 are both already registered on the M2M platform. The application 1 on the device 1 supports reception of the control command, and creates, on the M2M platform, a corresponding description resource for describing that the application 1 on the device 1 receives a control command resource. The description resource includes an address of the device resource on the device, an identifier and a function type of the device resource. The specific example of the description resource is shown in the following:

```
<LocalResInfo >
    <Address>coap://sense.m2m.com/DeviceID1/Applications/
    Application1/ControlCommands</Address>
    <FunctionType> PushCommand </FunctionType>
    <DataModleConstrain>...</DataModleConstrain>
</LocalResInfo>.
```

When the network application transmits the control command to the application 1 on the device 1, the specific process is as follows:

In S610, the network application transmits, to the M2M platform, a request 1, used for requesting creating a ControlCommand resource for the application 1 on the device 1. The request 1 is as follows:

```
POST .../DeviceID1/Applications/Application1/ControlCommands
Content-Type: application/xml; charset=UTF-8
    Host: example.com:80
<ControlCommands>...</ControlCommands>.
```

In S620, the M2M platform processes the request 1, generates a resource creating request 2 that is to be transmitted to the device 1, and transmits the resource creating request 2 to the device, where a destination address of the request 2 is an address of the application 1 on the device 1. The request 2 is as follows:

```
CON tid=01
POST .../DeviceID1/Applications/Application1/ControlCommands
Content-Type: application/xml; charset=UTF-8
```

```
    Host: sense.m2m.com:80
<ControlCommand>...</ControlCommand>.
```

In S630, after receiving the request 2, the device 1 transmits the control command to the application 1. The application 1 returns a result after processing the control command. The device 1 successfully creates the ControlCommand resource and returns the following creation success response:

```
ACK tid=01
201 Created
Location:
    oap://sense.m2m.com/DeviceID1/Applications/Application1/
    ControlCommands/ControlCommand5
Content-Type: application/xml; charset=UTF-8
    <ControlResult>...</ControlResult>.
```

It should be understood that for ease of understanding, packets in S620 and S630 are described in a text manner. The description of the packet has a difference from actual COAP coding, and is merely exemplary herein, and does not construct any limit to the embodiment of the present invention.

In S640, after receiving the creation success response, the M2M platform creates the CommandControl resource in a logic model of a local device resource interface, and returns the following creation success response to the network application:

```
HTTP/1.1 201 Created
Location:http://example.com
    /DeviceID1/Applications/Application1/ControlCommands/
    ControlCommand5
Content-Type: application/xml; charset=UTF-8
    <ControlResult>...</ControlResult>.
```

It can further be learned from the above specific embodiment that, in the method for performing an operation on a device resource in the embodiment of the present invention, based on the mapped address of the device resource on the management apparatus, the network application may perform an operation on the device resource, so that the management apparatus can provide a uniform device resource access interface to the network application, thereby reducing the complexity for the network application to perform an operation on the device resource and improving the convenience for the network application to perform an operation on the device resource. Therefore, extensive application of M2M can further be promoted.

A management apparatus for performing an operation on a device resource according to an embodiment of the present invention is described in the following.

Figure 8:
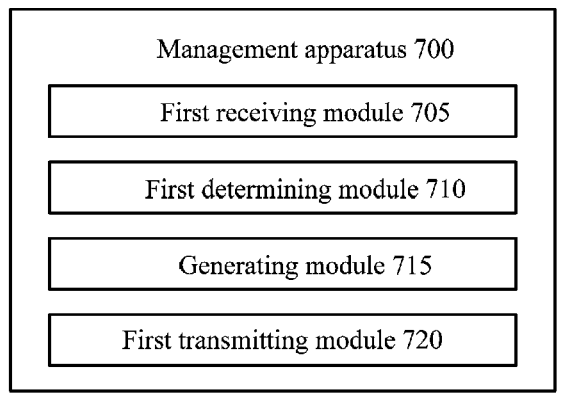
FIG. 8 is a schematic diagram of a management apparatus for performing an operation on a device resource according to an embodiment of the present invention.

FIG. 8 is a schematic diagram of a management apparatus 700 for performing an operation on a device resource according to an embodiment of the present invention. As shown in FIG. 8, the management apparatus 700 includes a first receiving module 705, a first determining module 710, a generating module 715, and a first transmitting module 720. The first receiving module 705 is configured to receive a first request, which is from a network application and requests an operation on a device resource, where a destination address of the first request is a mapped address of the device resource on the management apparatus. The first determining module 710 is configured to determine, according to the mapped address, that the device resource is created on a device corresponding to the device resource. The generating module 715 is configured to generate, based on a description resource of the device resource, a second request for performing an operation on the device resource on the device, where a destination address of the second request is an address of the device resource on the device. The first transmitting module 720 is configured to transmit the second request to the device.

In the management apparatus for performing an operation on a device resource in the embodiment of the present invention, based on the mapped address of the device resource on the management apparatus, the network application may perform an operation on the device resource, so that a uniform device resource access interface can be provided to the network application, thereby reducing the complexity for the network application to perform an operation on the device resource and improving the convenience for the network application to perform an operation on the device resource. Therefore, extensive application of M2M can further be promoted.

Figure 9:
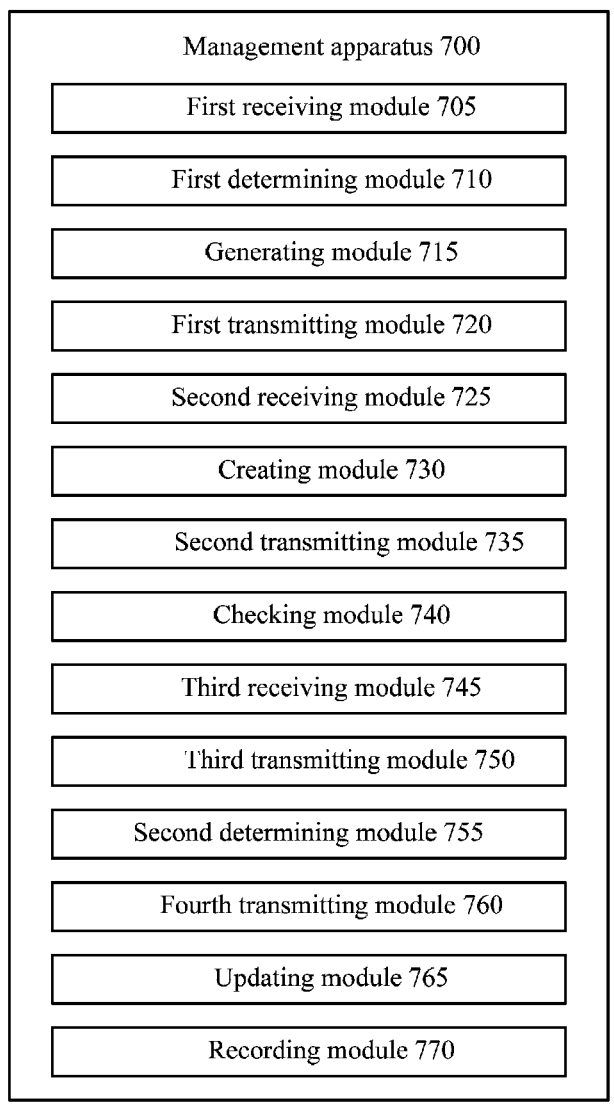
FIG. 9 is a schematic diagram of a management apparatus for performing an operation on a device resource according to another embodiment of the present invention.

Optionally, as shown in FIG. 9, the management apparatus 700 according to the embodiment of the present invention may further include:

a second receiving module 725, configured to receive a description resource creating request transmitted by the device, where the description resource creating request is used for requesting creating a description resource for describing the device resource; and a creating module 730, configured to create, based on the description resource creating request, the description resource, where the description resource includes the address of the device resource on the device and an identifier of the device resource.

Optionally, the management apparatus 700 may further include:

a second transmitting module 735, configured to transmit, to the device, a description resource creation success reply for replying to the description resource creating request, where the description resource creation success reply includes an address of the description resource.

Optionally, the management apparatus 700 may further include:

a checking module 740, configured to perform an authorization check after the first receiving module 705 receives the first request that the network application requests an operation on the device resource, so as to determine that the first request is allowed.

Optionally, the generating module 715 is further configured to generate, based on a protocol for communication between the management apparatus and the device, the second request.

Optionally, the management apparatus 700 may further include:

a third receiving module 745, configured to receive a second response which is transmitted by the device and responds to the second request; and a third transmitting module 750, configured to transmit, based on the second response, a first response for responding to the first request to the network application, where the first response is used for indicating a situation in which an operation is performed on the device resource.

Optionally, the management apparatus 700 may further include:

a second determining module 755, configured to: after the first receiving module 705 receives the first request that the network application requests an operation on the device resource, determine, according to the mapped address in the first request, that the device resource is created on the management apparatus; and a fourth transmitting module 760, configured to perform, according to the first request, a corresponding operation on the device resource, and transmit, to the network application, a third response for responding to the first request.

Optionally, the management apparatus 700 may further include an updating module 765, configured to update an application data instance that is corresponding to the device and is in a logic model of a device resource interface of the management apparatus, when the first request includes requesting acquiring the device resource, and the second response indicates that the device resource is successfully acquired.

Optionally, the management apparatus 700 may further include a recording module 770, configured to: when the first request includes requesting transmitting a control command to the device resource and the second response indicates that the control command is successfully transmitted to the device resource, record the control command on the management apparatus.

The above and other operations and/or functions of the modules of the management apparatus 700 are intended to implement processes corresponding to the methods 100, 200, 300, 400, 500 and 600 in FIG. 1 to FIG. 7, respectively, which are not described herein again for ease of description.

In the management apparatus for performing an operation on a device resource in the embodiment of the present invention, based on the mapped address of the device resource on the management apparatus, the network application may perform an operation on the device resource, so that a uniform device resource access interface can be provided to the network application, thereby reducing the complexity for the network application to perform an operation on the device resource and improving the convenience for the network application to perform an operation on the device resource. Therefore, extensive application of M2M can further be promoted.

Persons of ordinary skill in the art should appreciate that, in combination with the example described in the embodiments herein, each of the steps in the methods and the units can be implemented by electronic hardware, computer software, or a combination thereof. To clearly describe the interchangeability between the hardware and the software, the foregoing generally describes compositions and steps of each embodiment according to functions. Whether the functions are executed by hardware or software depends on particular applications and design constraints of the technical solutions. Person of ordinary skill in the art can use different methods to implement the described functions for each particular application, but it should not be considered that such implementation goes beyond the scope of the present invention.

The methods or steps described in combination with the embodiments disclosed herein may be implemented using hardware, a software program executed by a processor, or a combination thereof. The software program may be saved in a random access memory (RAM), a memory, a read-only memory (ROM), an electrically programmable ROM, an electrically erasable programmable ROM, a register, a hard disk, a removable magnetic disk, a CD-ROM, or a storage medium of any other form well-known in the technical field.

The present invention is described in detail with reference to the accompany drawings in combination with the exemplary embodiments, but the present invention is not limited thereto. Various equivalent modifications or replacements made by a person skilled in the art without departing from the idea and essence of the present invention shall fall within the scope of the present invention.

What is claimed is:

1. A method for performing, by a management apparatus comprising a processor configured to execute programs stored on a non-transitory computer readable medium, an operation on a device resource, comprising:
   receiving, by the management apparatus, a first request, from a network application that requests the operation on the device resource, wherein the first request includes a destination address that is a mapped address of the device resource on the management apparatus;
   determining, by the management apparatus according to the mapped address, that the device resource is located on a device corresponding to the device resource;
   generating, by the management apparatus based on receipt of the first request and a description resource of the device resource, a second request for performing the operation on the device resource on the device, wherein the second request includes a destination address that is an address of the device resource on the device;
   transmitting, by the management apparatus, the second request to the device;
   determining, according to the mapped address, that the device resource is located on the management apparatus;
   performing a corresponding operation on the device resource according to the first request; and
   transmitting, to the network application, a first response for responding to the first request.

2. The method according to claim 1, wherein before receiving the first request from the network application that requests the operation on the device resource, the method further comprises:
   receiving a description resource creating request transmitted by the device; and
   creating, based on the description resource creating request, the description resource, wherein the description resource comprises the address of the device resource on the device and an identifier of the device resource.

3. The method according to claim 2, further comprising:
   transmitting, to the device, a description resource creation success reply for replying to the description resource creating request, wherein the description resource creation success reply comprises an address of the description resource.

4. The method according to claim 1, further comprising:
   after receiving the first request from the network application that requests the operation on the device resource, performing an authorization check to determine that the first request is allowed.

5. The method according to claim 1, wherein generating the second request for performing the operation on the device resource on the device comprises:
   generating, based on a protocol for communication between the management apparatus and the device, the second request.

6. The method according to claim 1, further comprising:
   receiving a second response, which is transmitted by the device and responds to the second request; and
   transmitting, to the network application based on the second response, the first response for responding to the first request.

7. The method according to claim 6, wherein when the second response indicates that the device resource is successfully acquired, the method further comprises:
   updating an application data instance that corresponds to the device and is in a logic model of a device resource interface of the management apparatus.

8. The method according to claim 7, wherein receiving the first request from the network application that requests the operation on the device resource comprises:
   receiving the first request from the network application, wherein the first request requests transmitting a control command to the device resource.

9. The method according to claim 8, wherein when the second response indicates that the control command is successfully transmitted to the device resource, the method further comprises:
   recording the control command on the management apparatus.

10. The method according to claim 1, wherein receiving the first request from the network application that requests the operation on the device resource comprises:
    receiving the first request from the network application that requests acquiring the device resource.

11. A non-transitory computer readable medium including computer-executable instructions for execution on a management apparatus for performing an operation on a device resource, such that when the computer-executable instructions are executed by the management apparatus a method is carried out comprising:
    receiving a first request, from a network application that requests the operation on the device resource, wherein the first request includes a destination address that is a mapped address of the device resource on the management apparatus;
    determining according to the mapped address, that the device resource is located on a device corresponding to the device resource;
    generating based on receipt of the first request and a description resource of the device resource, a second request for performing the operation on the device resource on the device, wherein the second request includes a destination address that is an address of the device resource on the device;
    transmitting the second request to the device;
    determining, according to the mapped address, that the device resource is created on the management apparatus;
    performing a corresponding operation on the device resource according to the first request; and
    transmitting, to the network application, a first response for responding to the first request.

12. The computer readable medium according to claim 11, further comprising instructions for:
    receiving a description resource creating request transmitted by the device; and
    creating based on the description resource creating request, the description resource, wherein the description resource comprises the address of the device resource on the device and an identifier of the device resource.

13. The computer readable medium according to claim 12, further comprising instructions for:
    transmitting to the device, a description resource creation success reply for replying to the description resource creating request, wherein the description resource creation success reply comprises an address of the description resource.

14. The computer readable medium according to claim 11, further comprising instructions for:
  performing an authorization check to determine that the first request is allowed.

15. The computer readable medium according to claim 11, wherein the generating the second request for performing the operation on the device resource on the device instructions further included instructions for
  generating, based on a protocol for communication between the management apparatus and the device, the second request.

16. The computer readable medium according to claim 11, further comprising instructions for:
  receiving a second response, which is transmitted by the device and responds to the second request; and
  transmitting, based on the second response, the first response for responding to the first request to the network application.

17. The computer readable medium according to claim 16, further comprising instructions for:
  updating an application data instance that corresponds to the device and is in a logic model of a device resource interface of the management apparatus when the first request comprises a request to acquire the device resource and the second response indicates that the device resource is successfully acquired.

18. The computer readable medium according to claim 17, further comprising instructions for:
  recording, when the first request comprises a request to transmit a control command to the device resource and the second response indicates that the control command is successfully transmitted to the device resource, the control command on the management apparatus.

\* \* \* \* \*